(12) United States Patent
Hyun et al.

(10) Patent No.: US 9,804,699 B2
(45) Date of Patent: Oct. 31, 2017

(54) STRETCHABLE DISPLAY APPARATUS AND DISPLAY CONTROL METHOD AND APPARATUS OF THE STRETCHABLE DISPLAY APPARATUS

(71) Applicant: SAMSUNG DISPLAY CO., LTD., Yongin, Gyeonggi-Do (KR)

(72) Inventors: Changho Hyun, Yongin (KR); Cheolwoo Park, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 91 days.

(21) Appl. No.: 14/731,351

(22) Filed: Jun. 4, 2015

(65) Prior Publication Data

US 2016/0124536 A1 May 5, 2016

(30) Foreign Application Priority Data

Nov. 3, 2014 (KR) .......................... 10-2014-0151588

(51) Int. Cl.
*G06F 3/041* (2006.01)
*G06F 3/14* (2006.01)
*G06F 1/16* (2006.01)

(52) U.S. Cl.
CPC ............ *G06F 3/041* (2013.01); *G06F 1/1626* (2013.01); *G06F 1/1652* (2013.01); *G06F 3/14* (2013.01); *G06F 2203/04102* (2013.01)

(58) Field of Classification Search
None
See application file for complete search history.

(56) References Cited

U.S. PATENT DOCUMENTS

| 6,160,540 | A | * | 12/2000 | Fishkin | .................... | A63F 13/00 345/156 |
|---|---|---|---|---|---|---|
| 2011/0227822 | A1 | * | 9/2011 | Shai | ...................... | G06F 1/1615 345/156 |
| 2012/0038613 | A1 | * | 2/2012 | Choi | ...................... | G06F 1/1652 345/211 |
| 2013/0147849 | A1 | * | 6/2013 | Kwak | ...................... | G09G 5/14 345/666 |
| 2013/0278486 | A1 | * | 10/2013 | Duerksen | ................. | G09G 3/34 345/55 |
| 2014/0098028 | A1 | * | 4/2014 | Kwak | ...................... | G09G 5/00 345/173 |
| 2014/0375702 | A1 | * | 12/2014 | Cho | ...................... | G06F 1/3265 345/690 |

FOREIGN PATENT DOCUMENTS

| EP | 2 508 960 A2 | 10/2012 |
|---|---|---|
| JP | 11-312040 A | 11/1999 |
| KR | 10-2013-0123611 A | 11/2013 |
| KR | 10-2014-0044237 A | 4/2014 |

* cited by examiner

*Primary Examiner* — Stephen T Reed
(74) *Attorney, Agent, or Firm* — Lewis Roca Rothgerber Christie LLP

(57) ABSTRACT

A display control method of a stretchable display apparatus includes determining a degree of expansion of the display apparatus, and controlling a display mode of the display apparatus to be a first mode or a second mode based on the degree of expansion. A first resolution is embodied in the first mode by transmitting a data signal to each of pixel groups formed by classifying a plurality of pixels into the pixel groups. A second resolution is embodied in the second mode by transmitting a data signal to each of the plurality of pixels.

13 Claims, 13 Drawing Sheets

FIG. 5A
FIG. 5B
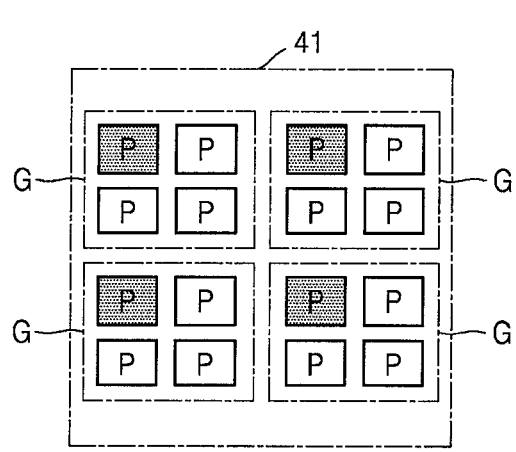
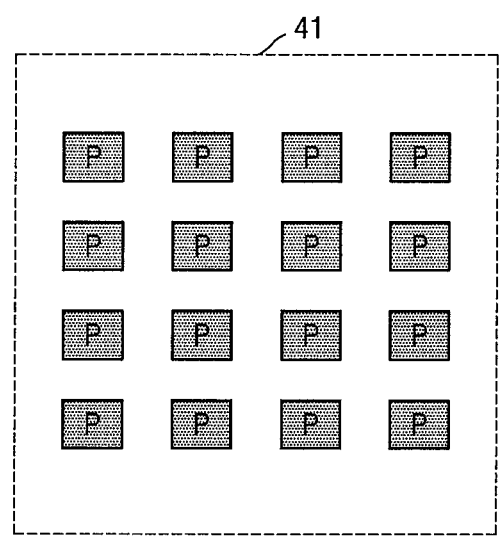

FIG. 10A
FIG. 10B
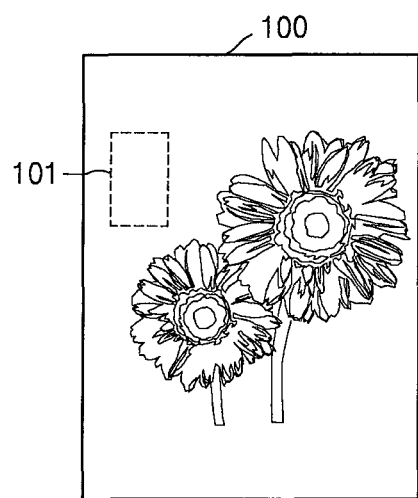
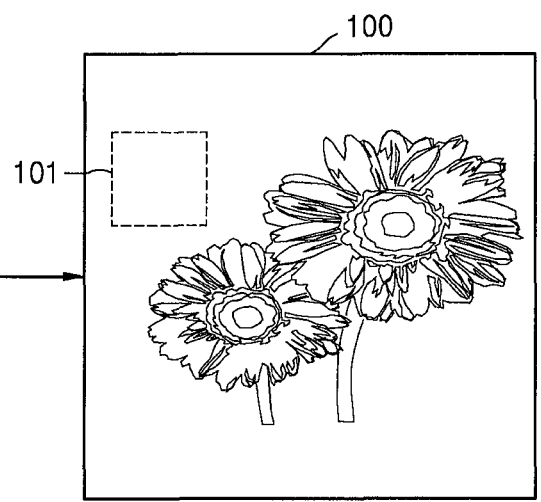

FIG. 11A
FIG. 11B
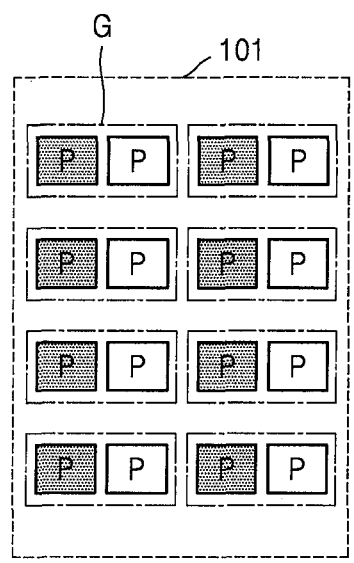
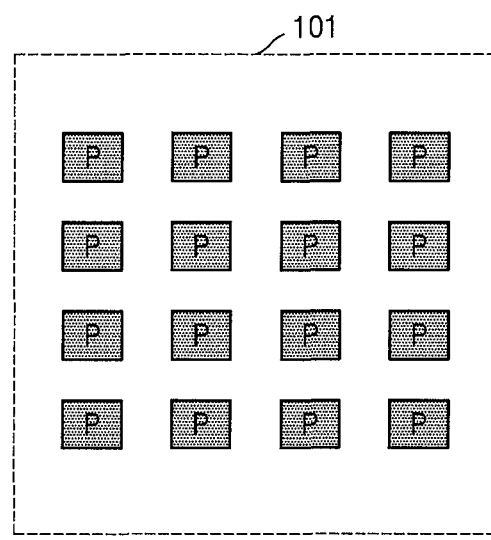

FIG. 13A
FIG. 13B
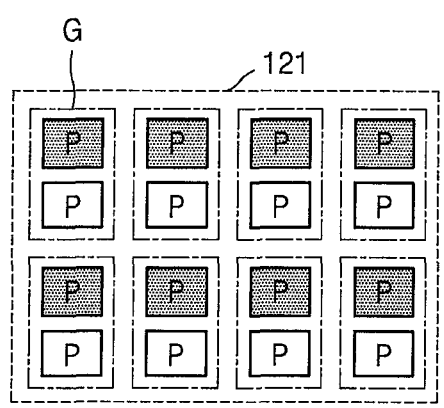
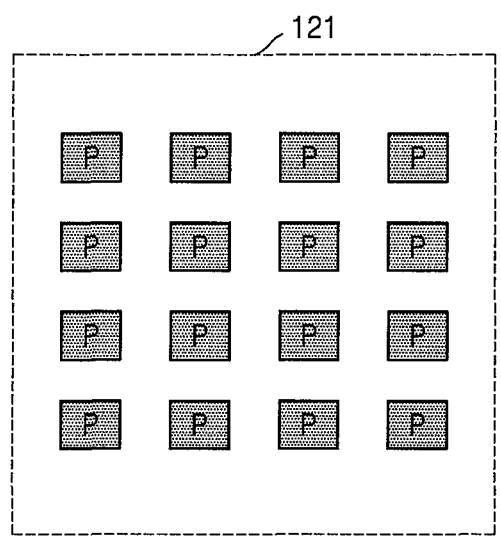

STRETCHABLE DISPLAY APPARATUS AND DISPLAY CONTROL METHOD AND APPARATUS OF THE STRETCHABLE DISPLAY APPARATUS

CROSS-REFERENCE TO RELATED APPLICATION

This application claims priority to and the benefit of Korean Patent Application No. 10-2014-0151588, filed on Nov. 3, 2014 in the Korean Intellectual Property Office, the entire content of which is incorporated herein by reference.

BACKGROUND

1. Field

Aspects of embodiments of the present invention relate to a stretchable display apparatus as well as a display control method and apparatus of the stretchable display apparatus.

2. Description of Related Art

With recent developments in display technology, research is being conducted on display apparatuses that can be bent, rolled, or stretched in at least one direction while they are being used. Such display apparatuses (e.g., changeable, stretchable, or expandable display apparatuses) may be transformed into various forms and thus, satisfy demands for both large sized displays and for small sized (e.g., portable) displays.

For example, changeable display apparatuses may be transformed into pre-set forms, and may be transformed into various other forms considering users' demands or situations around the display apparatuses. However, generating the same images for display even when such changeable display apparatuses are transformed may bother viewers of the display apparatuses.

SUMMARY

Embodiments of the present invention provide for a stretchable display apparatus as well as a display control method and apparatus of the stretchable display apparatus. Further embodiments provide for a stretchable display apparatus that may control resolution based on the level or degree of expansion (or stretching) of the display apparatus, as well as a display control method and apparatus of the stretchable display apparatus. Additional aspects will be set forth in part in the description that follows and, in part, will be apparent to one of ordinary skill from the description, or may be learned by practice of the presented embodiments.

In an embodiment of the present invention, a display control method of a stretchable display apparatus is provided. The display control method includes determining a degree of expansion of the display apparatus, and controlling a display mode of the display apparatus to be a first mode or a second mode based on the degree of expansion. A first resolution is embodied in the first mode by transmitting a data signal to each of pixel groups formed by classifying a plurality of pixels into the pixel groups. A second resolution is embodied in the second mode by transmitting a data signal to each of the plurality of pixels.

The determining of the degree of expansion may include determining the degree of expansion in a first direction and in a second direction perpendicular to the first direction. The controlling of the display mode may include classifying the plurality of pixels into the pixel groups based on the degree of expansion in each direction.

The plurality of pixels may be arranged in row and column directions. The first direction may be the row direction. The second direction may be the column direction.

In the first mode, only some of the pixels included in each of the pixel groups may emit light.

In the controlling of the display mode to be the first mode, the display mode may be set to the first mode when a length in a first direction of the display apparatus shortens to less than a first criterion, the pixels continuously arranged in the first direction may be classified into the pixel groups, and a data signal may be transmitted to each of the pixel groups.

In the controlling of the display mode, the second mode may be selected when the length in the first direction and a length in a second direction perpendicular to the first direction are more than corresponding second criteria respectively pre-set for the first and second directions, and the first mode may be selected when the length in the first direction or the length in the second direction is less than corresponding first criteria respectively pre-set for the first and second directions. When the first mode is selected, the first resolution may be a resolution with respect to a corresponding one of the first direction or the second direction along which a corresponding one of the lengths shortens to less than the respective first criterion, and may be less than a maximum resolution.

Respective ones of the first criteria and the second criteria may be substantially the same.

Respective ones of the first criteria may be less than respective ones of the second criteria.

The display control method may further include outputting image signals according to the display mode.

In another embodiment of the present invention, a display control apparatus of a stretchable display apparatus is provided. The display control apparatus includes an expansion level determiner configured to determine a degree of expansion of the display apparatus, and a display mode controller configured to control a display mode of the display apparatus based on the degree of expansion. The display mode includes a first mode in which a first resolution is embodied by transmitting a data signal to each of pixel groups formed by classifying a plurality of pixels into the pixel groups, and a second mode in which a second resolution is embodied by transmitting a data signal to each of the plurality of pixels.

The display control apparatus may further include an image signal output unit configured to output image signals according to the display mode.

In yet another embodiment of the present invention, a stretchable display apparatus includes a display panel stretchable in at least one direction, a sensing unit configured to measure a degree of expansion of the display panel, and a controller configured to control a display mode of the display apparatus depending on the degree of expansion. The controller includes an expansion level determiner configured to determine the degree of expansion of the display panel, and a display mode controller configured to control a display mode of the display apparatus depending on the degree of expansion. The display mode includes a first mode in which a first resolution is embodied by transmitting a data signal to each of pixel groups formed by classifying a plurality of pixels into the pixel groups, and a second mode in which a second resolution is embodied by respectively transmitting a data signal to each of the plurality of pixels.

The controller may further include an image signal output unit configured to output image signals according to the display mode.

These general and specific embodiments may be implemented, for example, by using a system, a method, a computer program, or combinations thereof.

BRIEF DESCRIPTION OF THE DRAWINGS

These and/or other aspects of the present invention will become apparent and more readily appreciated from the following description of example embodiments, taken in conjunction with the accompanying drawings in which:

FIGS. 5A-5B are schematic views showing areas in the display apparatus of FIGS. 4A-4B, respectively;

FIGS. 10A-13B are views showing example groupings of pixels in a stretchable display apparatus according to an embodiment of the present invention.

DETAILED DESCRIPTION

Figure 1:
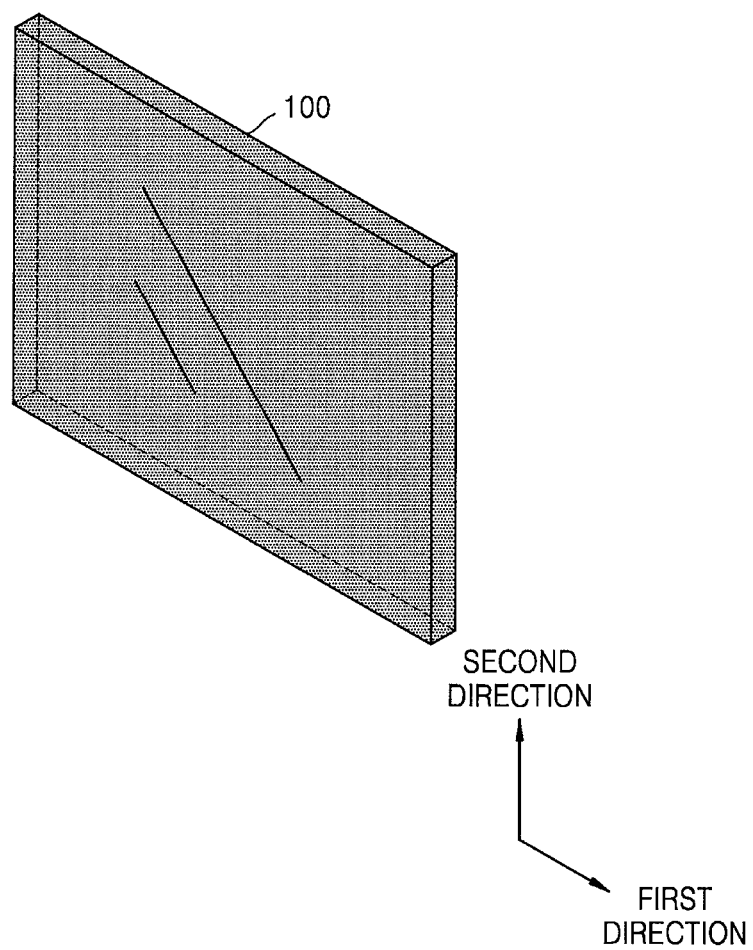
FIG. 1 is a view showing a stretchable display apparatus according to an embodiment of the present invention.

The present invention will be described more fully with reference to the accompanying drawings, in which example embodiments are shown. The present invention may, however, be embodied in many different forms and should not be construed as being limited to the embodiments set forth herein; rather these embodiments are provided to more thoroughly convey aspects and concepts of the invention to one of ordinary skill in the art. Reference will now be made in detail to example embodiments illustrated in the accompanying drawings, wherein similar or like reference numerals refer to similar or like elements throughout, and detailed descriptions thereof may not be repeated.

It will be understood that although the terms "first," "second," etc., may be used herein to describe various components, these components should not be limited by these terms. These terms are used primarily to distinguish one component from another. It will be further understood that the terms "comprises" and/or "comprising" used herein specify the presence of stated features or components, but do not preclude the presence or addition of one or more other features or components.

Sizes of elements in the drawings may be exaggerated for convenience of description, but the present invention is not limited thereto. In embodiments of the present invention, the x-axis, the y-axis, and the z-axis are not limited to three axes of the rectangular coordinate system, but rather may be interpreted in a broader sense. For example, the x-axis, the y-axis, and the z-axis may be perpendicular to one another, or may represent different directions that are not perpendicular to one another.

Herein, the use of the term "may," when describing embodiments of the present invention, refers to "one or more embodiments of the present invention." In addition, the use of alternative language, such as "or," when describing embodiments of the present invention, refers to "one or more embodiments of the present invention" for each corresponding item listed. Hereinafter, embodiments of the present invention will be described with reference to the accompanying drawings.

The stretchable display apparatuses and/or any other relevant devices or components according to embodiments of the present invention described herein may be implemented utilizing any suitable hardware, firmware (e.g., an application-specific integrated circuit), software, or a suitable combination of software, firmware, and hardware. For example, the various components of the stretchable display apparatuses may be formed on one integrated circuit (IC) chip or on separate IC chips. Further, the various components of the stretchable display apparatuses may be implemented on a flexible printed circuit film, a tape carrier package (TCP), a printed circuit board (PCB), or formed on a same substrate as the stretchable display apparatus .

Further, the various components of the stretchable display apparatuses may be a process or thread, running on one or more processors, in one or more computing devices, executing computer program instructions and interacting with other system components for performing the various functionalities described herein. The computer program instructions are stored in a memory that may be implemented in a computing device using a standard memory device, such as, for example, a random access memory (RAM). The computer program instructions may also be stored in other non-transitory computer readable media such as, for example, a CD-ROM, flash drive, or the like. In addition, a person of skill in the art should recognize that the functionality of various computing devices may be combined or integrated into a single computing device, or the functionality of a particular computing device may be distributed across one or more other computing devices without departing from the scope of the present invention.

FIG. 1 is a view showing a stretchable display apparatus 100 according to an embodiment of the present invention. The display apparatus 100 illustrated in FIG. 1 is stretchable in at least one direction. For example, the display apparatus 100 may be stretchable in a first direction, such as a horizontal direction or row direction, or in a second direction, such as a vertical direction or column direction, or in both a first direction and a second direction different from (e.g., perpendicular to) the first direction. Being stretchable refers primarily to expansion and contraction. For example, the display apparatus 100 may be expanded or contracted, in one or more dimensions or directions, the level or degree of which is referred to herein as the "degree of expansion." The display apparatus 100 may be a flexible display apparatus.

Figure 2:
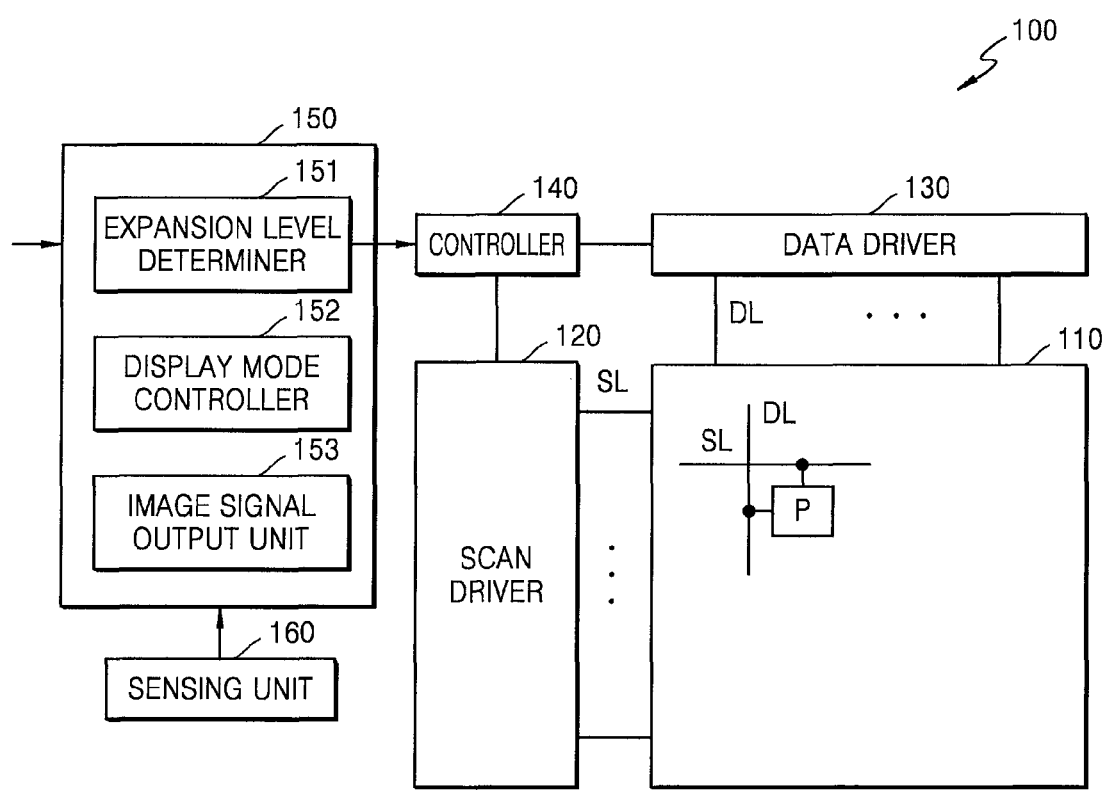
FIG. 2 is a block diagram of a stretchable display apparatus according to an embodiment of the present invention.

FIG. 2 is a block diagram of a stretchable display apparatus 100 according to an embodiment of the present invention.

Referring to FIG. 2, the display apparatus 100 includes a display panel 110, a scan driver 120, a data driver 130, a controller 140, a display control apparatus 150, and a sensing unit 160. All components included in the display apparatus 100 may be formed to be stretchable, especially the display panel 110. However, for ease of description, the terms "stretching," "expanding," and "contracting" (and similar forms) as used herein when applied to the display apparatus 100 will generally be directed to the display panel 110 of the display apparatus 100.

The display panel 110 includes a plurality of pixels and displays an image by emitting light according to signals transmitted from the scan driver 120 and the data driver 130. The data driver 130 converts image signals to analog or digital data signals and transmits the analog or digital data signals to data lines DL according to a control of the controller 140. The scan driver 120 generates scan pulses and sequentially transmits the scan pulses according to a control of the controller 140 to scan lines SL to select a pixel row to which the data signals are to be applied. The controller 140 drives the data driver 130 and the scan driver 120.

The display control apparatus 150 generally controls a display of the display apparatus 100. For example, according to an embodiment of the present invention, the display control apparatus 150 sets a display mode of the display apparatus 100, generates image signals according to the display mode, and transmits the image signals to the controller 140.

The display apparatus 100 may change resolution of the display panel 110 depending on the level or degree of expansion of the display apparatus 100 or display panel 110 (for ease of description, expansion or contraction of the display apparatus 100 will generally refer to expansion or contraction of the display panel 110). For example, when the display apparatus 100 expands, a high resolution image may be provided, and when the display apparatus 100 contracts, a low resolution image may be provided. When the display apparatus 100, includes a constant number of (structural or physical) pixels and then changes the resolution thereof as described above, an area of the display apparatus 100 is correspondingly changed by expanding or contracting the display apparatus 100.

Accordingly, the number of image (or logical) pixels in a unit area (pixels per inch, ppi) may remain substantially constant regardless of the degree of expansion or contraction of the display apparatus 100. The term "image pixel" used herein does not refer to a structural (or physical) pixel disposed in a display apparatus, but rather to a group of one or more structural pixels that form a basic unit for displaying image data. As such, the number of structural pixels that make up an image pixel may change dynamically depending on the resolution of the display apparatus 100. In this regard, the display apparatus 100 may have various positive effects including saving power by changing the resolution of the display panel 110 and may also provide a user with a constant resolution quality (such as substantially the same number of image pixels per inch).

The sensing unit 160 senses the degree of expansion of the display apparatus 100. For example, the sensing unit 160 may sense the degree of expansion by measuring resistance of the display apparatus 100. However, the present invention is not limited thereto, and in other embodiments, the sensing unit 160 may sense the degree of expansion of the display apparatus 100 in various ways. For example, the sensing unit 160 may sense the degree of expansion of the display apparatus 100 by using various sensors such as an acceleration sensor, an angular velocity sensor, a gyro sensor, or a current sensor. When the sensing unit 160 senses the degree of expansion of the display apparatus 100, the degree of expansion may be respectively recognized, for example, in an x-axis direction and a y-axis direction that is perpendicular to the x-axis direction.

In FIG. 2, the display control apparatus 150 includes an expansion level determiner 151, a display mode controller 152, and an image signal output unit 153. The expansion level determiner 151 determines the degree of expansion by obtaining a measured value of the degree of expansion of the display apparatus 100 from the sensing unit 160. The degree of expansion may be respectively measured in the x-axis and y-axis directions. The display mode controller 152 sets the display mode of the display apparatus 100 based on the degree of expansion determined by the expansion level determiner 151, and the image signal output unit 153 outputs an image signal according to the display mode set by the display mode controller 152.

For example, and for ease of description, the display mode controller 152 may select the display mode of a first mode or a second mode by taking into account the degree of expansion of the display apparatus 100. Here, an image is displayed at a first resolution on the display apparatus 100 in the first mode, and an image is displayed at a second resolution in the second mode. The first and second resolutions have different values from each other. For example, the second resolution may be a maximum resolution using all physical pixels included in the display panel 110, and the first resolution may be a lower resolution than the second resolution.

Hereinafter, for ease of description, one or more embodiments of the present invention will be described assuming that the second resolution is the maximum resolution of the display panel 110, and the first resolution is lower than the second resolution. The display mode controller 152 may select the second mode when the display apparatus 100 is expanded so that the display apparatus 100 may be driven at the maximum resolution. The display mode controller 152 may select the first mode when the display apparatus 100 contracts so that the display apparatus 100 may be driven at a low resolution. However, this is for convenience of description, and the present invention is not limited thereto. In other embodiments, there may be three or more display modes, each of which relate to different ranges (possibly overlapping) of expansion levels of the display apparatus 100.

Hereinafter when describing the degree of expansion of the display apparatus 100, a high degree of expansion refers to expanding the display apparatus 100 (e.g., to its maximum size), and a low degree of expansion refers to contraction of the display apparatus 100 (e.g., to its minimum size). However, the aforementioned descriptions are for convenience and thus, the present invention is not limited thereto. In addition, for ease of description, the degree of expansion will generally be discussed as applied to one dimension (such as a length), but is intended to cover multiple dimensions or directions (e.g., length and height, length and width), which may be applied together or independently. As such, display mode may be applied on a dimension-by-dimension basis in some embodiments.

The display mode controller 152 may select the display mode, for example, based on a pre-set criterion and a length of the display apparatus 100. For example, the display mode controller 152 may select the second mode when the length of the display apparatus 100 exceeds a second criterion (such as 60% of the way between the minimum expansion level and the maximum expansion level), and may select the first mode when the length of the display apparatus 100 is shorter than a first criterion (such as 40% of the between the minimum and maximum expansion levels). Here, both the first and second criteria may be provided for each direction in which the display apparatus 100 is expanded or contracted. In addition, 60% and 40% are example amounts. In other embodiments, for example, 50% may be used for both the second criterion and the first criterion.

The first and second criteria may be provided, for example, for each of the x-axis and y-axis directions. The display mode controller 152 may select the second mode when the lengths of the display apparatus 100 in the x-axis and y-axis directions exceed the corresponding second criterion. Otherwise, the display mode controller 152 may select the first mode, particularly, when at least one length of the display apparatus 100 in the x-axis and y-axis directions is less than the corresponding first criterion.

In other embodiments, the dimensions may be driven independently. For example, when the display apparatus 100 is fully expanded in the both x-axis and y-axis directions, the display mode controller 152 may drive the display apparatus 100 at the maximum resolution (e.g., high resolution in the second mode for both directions). When at least one of the lengths in the x-axis and y-axis directions shortens, the display mode controller 152 may drive the display apparatus 100 at a low resolution (e.g., first mode) with respect to a direction along which the length is shortened. The display mode controller 152 may set respective resolutions (e.g., display modes) for the x-axis and y-axis directions when driving the display apparatus 100.

In order to embody the respective resolution for each direction as described above, the image signal output unit 153 may obtain external image signals and output the image signals after adjusting for the resolution of the display apparatus 100 (based on the display mode). For example, the image signal output unit 153 may output image signals having a resolution corresponding to the display mode of the display apparatus 100.

In some embodiments, the image signal output unit 153 outputs image signals having the first resolution when the display mode of the display apparatus 100 is the first mode and outputs image signals having the second resolution when the display mode of the display apparatus 100 is the second mode, based on the external image signals. For example, when the resolution of the external image signals are the same as the maximum resolution of the display apparatus 100, the image signal output unit 153 downscales the external image signals to the first resolution when in the first mode, but leaves the external image signals intact in the second resolution when in the second mode.

In some embodiments, the display mode controller 152 may set the display mode of the display apparatus 100 to the first mode or the second mode, and may set a resolution and a detailed driving method of the first mode. For example, when the display mode of the display apparatus 100 is the first mode, the display mode controller 152 may select a resolution lower than the maximum resolution and classify the physical pixels included in the display panel 110 into groups (logical pixels) in order to drive the display apparatus 100 at the selected resolution. Each pixel group classified above may correspond to an image pixel in an image, and a data signal may be assigned and provided to each pixel group.

For example, the display mode controller 152 may classify pixels into groups in the first mode by taking into account the degree of expansion. The display mode controller 152 may classify the pixels in the first mode based on the level and direction of expansion. For example, when the display apparatus 100 contracts in the first direction and is shorter than the first criterion, the display mode controller 152 may set the resolution of the first direction to a resolution that is lower than the maximum resolution in the first mode, such as half the resolution. In this regard, pixels sequentially arranged in the first direction may be classified as a pixel group, such as two physical pixels in the first direction for each logical (or image) pixel.

The display mode controller 152 may also set both the resolutions of the first and second directions to resolutions lower than the maximum resolution (for example, half the resolution) when the display apparatus 100 contracts and is shorter than the first criterion in both the first and second directions. To this end, pixels sequentially arranged in the first and second directions may be classified as a pixel group, such as two physical pixels in each of the first direction and second direction (four physical pixels total) for each image pixel. The data signal may be applied to each pixel group.

The first and second criteria may be an identical value (such as an identical percentage of expansion between the minimum expansion level and the maximum expansion level) for each direction. For example, the display mode controller 152 may set a predetermined criterion and then when the length of the display apparatus 100 is shorter than the predetermined criterion, the first mode is selected, and when the length of the display apparatus 100 is longer than the predetermined criterion, the second mode is selected.

However, the present invention is not limited thereto, and in other embodiments, the first criterion may have a smaller value than the second criterion. By setting the first criterion smaller than the second criterion, the resolution may be prevented from continuously changing as the length of the display apparatus 100 approaches the predetermined criterion. In this regard, when the length of the display apparatus 100 is between the first and second criteria, the display apparatus 100 may remain in the first mode, or in the second mode (depending on the mode currently being displayed).

In further detail, when the length of the display apparatus 100 contracts from a length longer than the first criterion to a length shorter than the first criterion, the display apparatus 100 is driven in the first mode, and when the length of the display apparatus 100 expands from a length shorter than the second criterion to a length longer than the second criterion, the display apparatus 100 is driven in the second mode. In addition, when the length of the display apparatus 100 contracts from a length longer than the second criterion to a length shorter than the second criterion but still longer than the first criterion, the display apparatus 100 remains driven in the second mode, and when the length of the display apparatus 100 expands from a length shorter than the first criterion to a length longer than the first criterion but still shorter than the second criterion, the display apparatus 100 remains driven in the first mode.

The display mode controller 152 may set some or all of the pixels for each pixel group to emit light in the first mode. For example, the display mode controller 152 may select only some of the pixels for the each pixel group to emit light when selecting the first mode. In this regard, the number of the pixels emitting light is reduced, which may save power. Thus, when the length of the display apparatus 100 is reduced, the number of pixels emitting light is correspondingly reduced. As such, the number of the pixels emitting light in a unit area remains substantially constant, and a user may watch an image with substantially constant luminance and resolution per inch.

Figure 3:
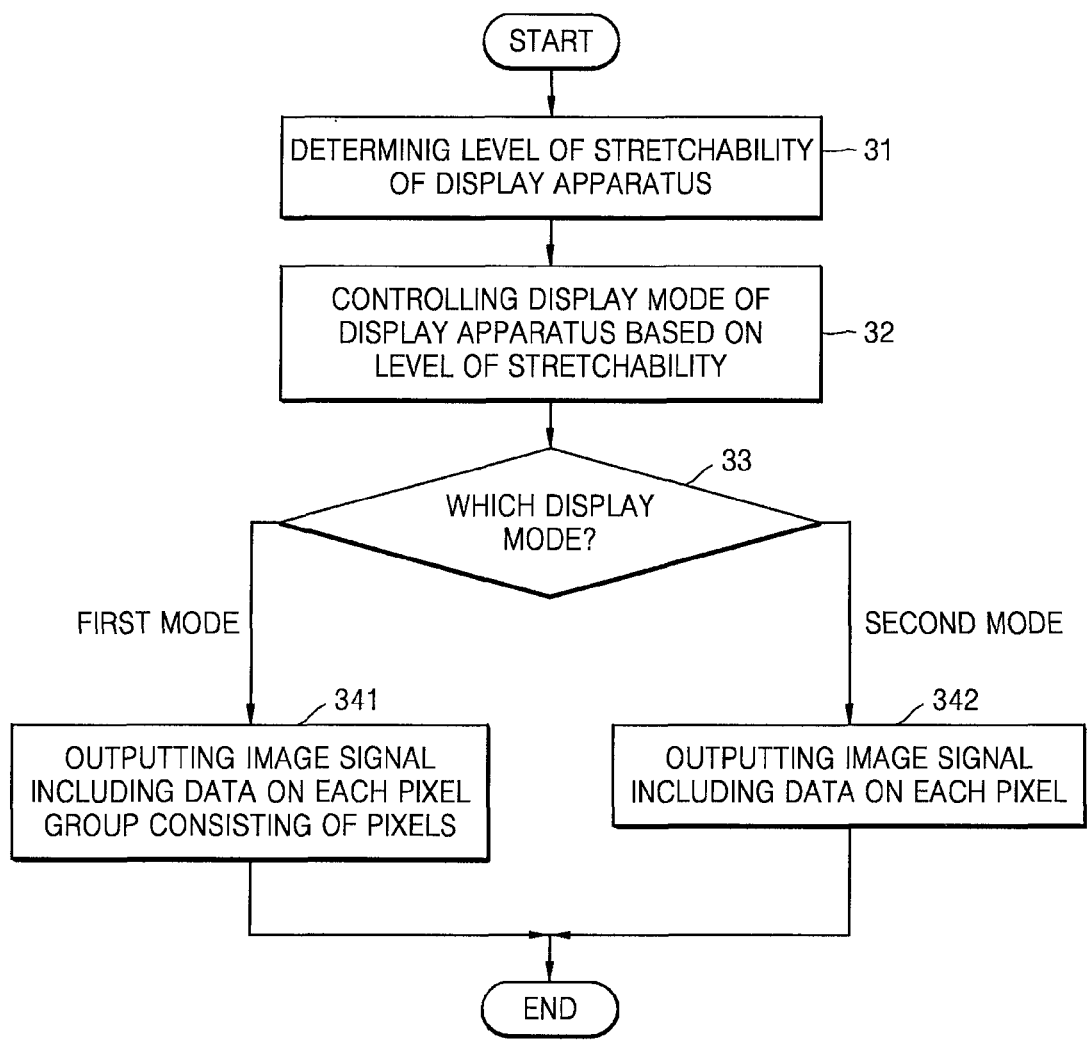
FIG. 3 is a flow chart describing an example display control method of the stretchable display apparatus of FIG. 2 according to an embodiment of the present invention.

FIG. 3 is a flow chart describing an example display control method of the display apparatus of FIG. 2 according to an embodiment of the present invention.

The flow chart illustrated in FIG. 3 sequentially shows operations performed in the display apparatus 100, particularly in the display control apparatus 150 in FIG. 2. Therefore, the foregoing descriptions of the structure illustrated in FIG. 2 may also be applicable to the flow chart of FIG. 3 even though not necessarily repeated.

Referring to FIG. 3, in operation 31, the expansion level determiner 151 determines the degree of expansion of the display apparatus 100. In operation 32, the display mode controller 152 controls the display mode of the display apparatus 100 based on the degree of expansion. In operation 33, the image signal output unit 153 proceeds to operation 341 or operation 342 depending on the display mode of the display apparatus 100. Operation 341 is performed in the first mode, and operation 342 is performed in the second mode. The second mode refers to when the display apparatus 100 is driven at the maximum resolution, and the first mode refers to when the display apparatus 100 is driven at a resolution lower than the maximum resolution (such as half the maximum resolution). In operation 341, the display mode controller 152 classifies pixels as groups (image pixels), and the image signal output unit 153 outputs an image signal for each pixel group. In operation 342, the image signal output unit 153 outputs an image signal for each pixel.

Figures 4A, 4B:
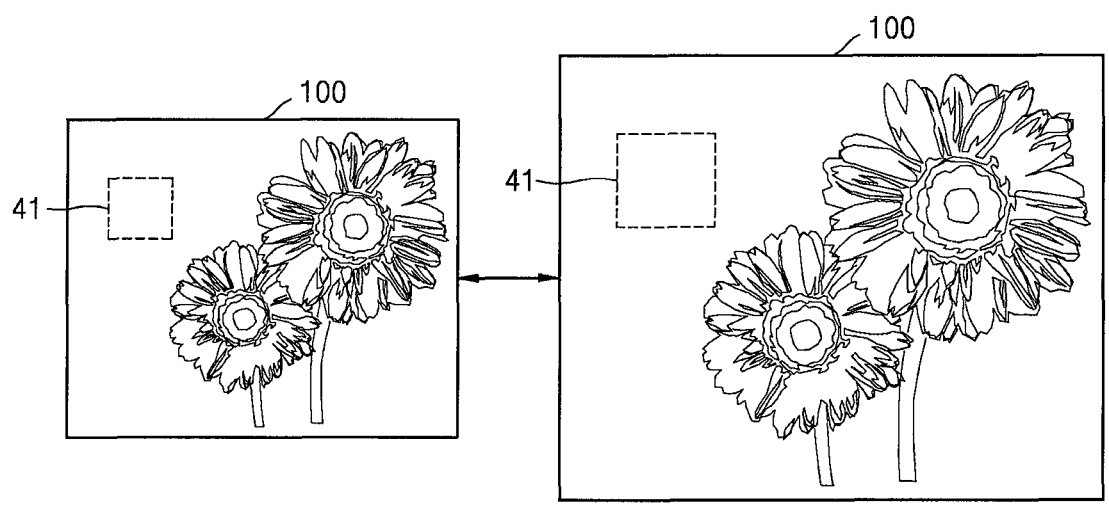
FIGS. 4A-4B show a stretchable display apparatus when contracted and when expanded, respectively.

FIGS. 4A and 4B show a stretchable display apparatus 100 when contracted and when expanded, respectively.

FIG. 4A shows the display apparatus 100 when contracted, and FIG. 4B shows the display apparatus 100 when expanded. In more detail, lengths in the x-axis and y-axis directions are less than the first criterion in FIG. 4A, and lengths in the x-axis and y-axis directions are more than the second criterion in FIG. 4B. Referring to FIGS. 4A and 4B, the display apparatus 100 displays an identical image when the display apparatus 100 contracts or expands, and it may be observed that the size of the image displayed on the display apparatus 100 changes as the size of the display apparatus 100 changes.

FIGS. 5A and 5B are schematic views showing an area 41 in FIGS. 4A and 4B, respectively.

FIG. 5A shows the area 41 of the display apparatus 100 illustrated in FIG. 4A, and FIG. 5B shows the area 41 of the display apparatus 100 illustrated in FIG. 4B. The areas 41 in FIGS. 4A to 5B represent an identical area on the display panel 110 but the degree of expansion of the area varies. Referring to FIGS. 5A and 5B, the display apparatus 100 in FIG. 5A is driven in the first mode, and the display apparatus 100 in FIG. 5B is driven in the second mode.

The display apparatus 100 in FIG. 4A has lengths that are shorter than the first criterion in the x-axis and y-axis directions and thus, in FIG. 5A, two pixels adjacent to each other in the x-axis direction and two pixels adjacent to each other in the y-axis direction (four pixels in total) are set as a pixel group G (a single image pixel). A data signal is applied to each of the pixel groups G. Depending on the embodiment, all pixels within the pixel group G may emit light (e.g., according to an identical data value), or some of the pixels within the pixel group G may emit light.

Referring to FIGS. 5A and 5B, only one pixel in each pixel group G emits light, and the pixel emitting light is illustrated in dark color. Although only one pixel in each of the pixel groups G emits light in FIG. 5A, the present invention is not limited thereto. When a plurality of pixels in the pixel group G emit light, the scan driver 120 and the data driver 130 may concurrently transmit a scan signal and a data signal to each of the pixels in the pixel group G emitting light, but the present invention is not limited thereto.

The display apparatus 100 in FIG. 4B has lengths that are longer than the second criterion in the x-axis and y-axis directions and thus, the display mode is set to the second mode. Accordingly, referring to FIG. 5B, signals are transmitted to each of the pixels and all the pixels emit light.

Referring to the embodiment of FIGS. 5A and 5B, when the display apparatus 100 expands, the display apparatus 100 is driven at the maximum resolution as illustrated in FIG. 5B, and when the display apparatus 100 contracts, the display apparatus 100 classifies the pixels into pixel groups G to be driven at a low resolution as illustrated in FIG. 5A, which may reduce power consumption.

Referring to FIGS. 5A and 5B, the display apparatus 100 in FIG. 5A is driven at a lower resolution than the display apparatus in FIG. 5B. However, the size of the display apparatus 100 in FIG. 5A is also smaller than that in FIG. 5B and thus substantially the same number of image pixels per inch emit light. Accordingly, the two resolutions in FIGS. 5A and 5B may appear to be similar to a user.

Figure 6:
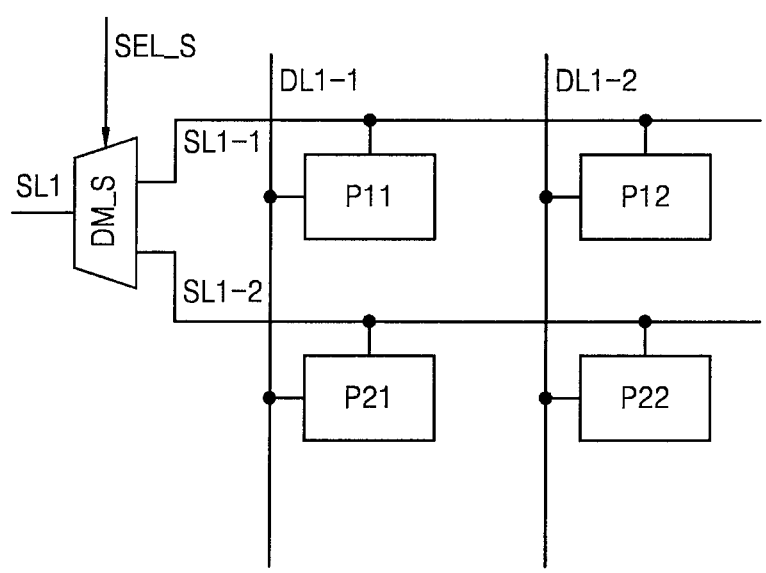
FIG. 6 shows pixels included in a pixel group of FIGS. 5A-5B.

FIG. 6 shows the pixels included in the pixel group G in FIGS. 5A and 5B. For convenience, in FIG. 6, a first column refers to a column including pixels P11 and P21, a second column refers to a column including pixels P12 and P22, a first row refers to a row including the pixels P11 and P12, and a second row refers to a row including the pixels P21 and P22.

Referring to FIG. 6, a first scan line SL1-1 and a second scan line SL1-2 respectively receive scan signals from a demux DM_S. The demux DM_S respectively outputs the scan signals to the first scan line SL1-1 and the second scan line SL1-2 according to a scan signal from a scan line SL1 and a scan selection signal SEL_S. By using the demux DM_S, the scan driver 120 may transmit the scan signal to the scan line SL1 regardless of the display mode, and by using the scan selection signal SEL_S, the scan driver 120 may transmit the scan signal to the appropriate scan lines depending on the display mode. For example, the scan selection signal SEL_S varies depending on the display mode and thus, causes the scan signal to be accordingly output to the first scan line SL1-1 and the second scan line SL1-2.

However, the present invention is not limited thereto. For example, the demux DM_S may be omitted in the display apparatus 100, and the scan driver 120 may directly transmit a scan signal to each pixel row of the scan lines.

In FIG. 6, the first column receives a data signal through the first data line DL1-1, and the second column receives a data signal through the second data line DL1-2. Depending on the display mode, the data signal for a particular column may be set to a value that causes the corresponding pixel in a selected row to not emit light.

Figure 7:
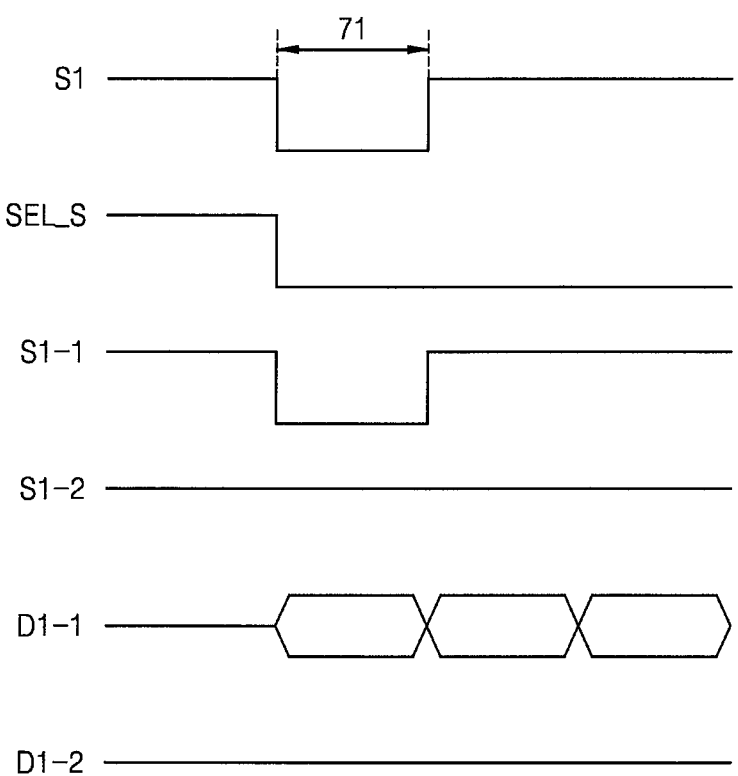
FIGS. 7 to 9 are waveform diagrams of signals transmitted to lines illustrated in FIG. 6.
Figure 8:
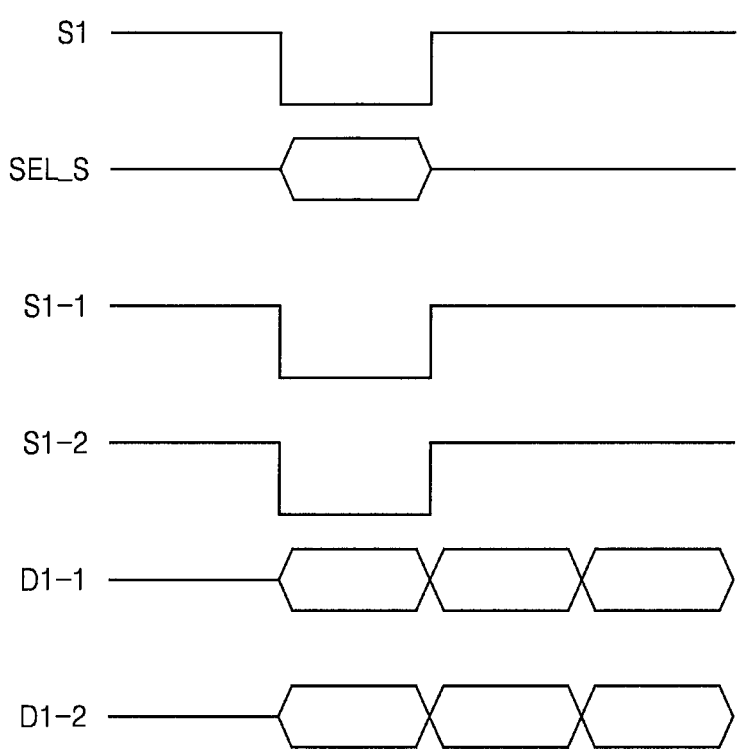
Figure 9:
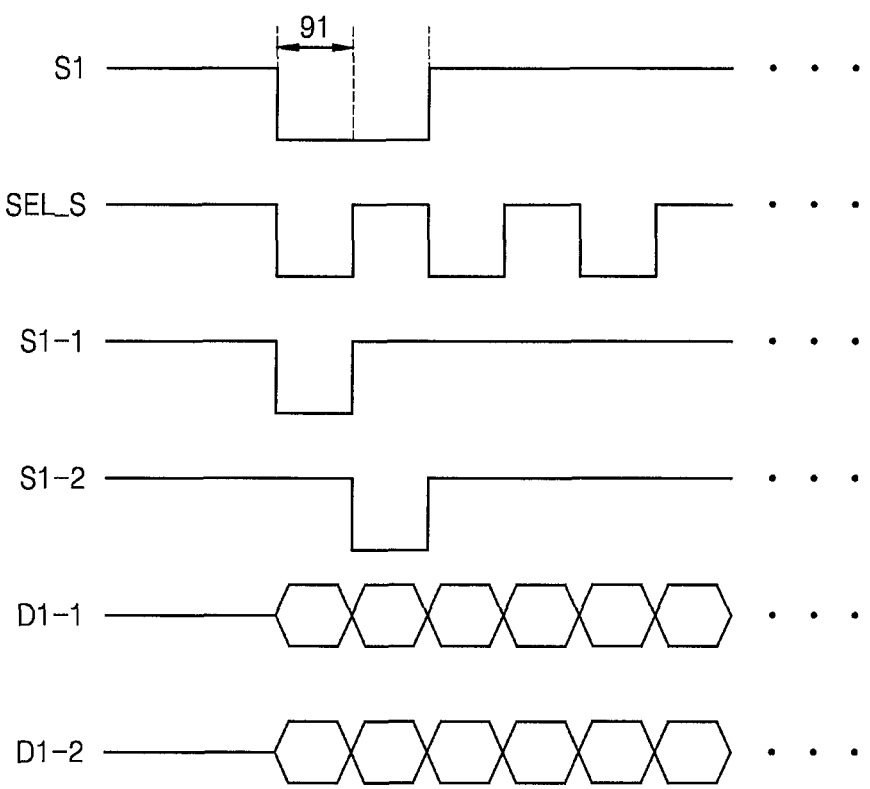

FIGS. 7 to 9 are waveform diagrams of signals transmitted to lines illustrated in FIG. 6.

FIG. 7 shows a waveform diagram of the signals when the display apparatus 100 is driven in the first mode, and the pixel P11 from among the pixels in FIG. 6 emits light. In FIG. 7, it is shown that a low voltage is a logic ON level and a high voltage is a logic OFF level, but the present invention is not limited thereto. The low voltage may be set to the logic OFF level and the high voltage may be set to the logic ON level.

Referring to FIG. 7, the scan selection signal SEL_S remains at an ON level when the scan signal 51 is transmitted and thus, the scan signal 51 is output to the first scan line SL1-1. Accordingly, a first scan signal S1-1 transmitted to the first scan line SL1-1 has the same value as the scan signal 51, and a second scan signal S1-2 transmitted to the second scan line SL1-2 is at an OFF level or in a high state. In this regard, a scan signal is only transmitted to the first row from among the pixel groups G illustrated in FIG. 6.

Referring to FIG. 7, a first data signal D1-1 transmitted to the first data line DL1-1 provides a data signal corresponding to the pixel group while synchronizing the data signal with the scan signal. FIG. 7 is the waveform diagram in which only the pixel P11 from among the pixels included in the pixel group illustrated in FIG. 6 emits light and thus, the second data signal D1-2 transmitted to the second data line DL1-2 is illustrated to be at the OFF level (e.g., corresponding to no light emission in the pixel). According to the waveform diagram in FIG. 7, the pixel P11 receives the scan signal along with a data signal and thus, only the pixel P11 from among the pixels included in the pixel group G in FIG. 6 emits light.

FIG. 8 is the waveform diagram in which the display apparatus is driven in the first mode and the pixels P11 and P21 from among the pixels included in the pixel group G in FIG. 6 emit light. Hereinafter, differences between FIGS. 7 and 8 will be mainly described, and although not repeated here, descriptions of FIG. 7 may be applicable to FIG. 8.

Referring to FIG. 8, the scan signal 51 is transmitted to the first scan line SL1-1 (as the first scan signal S1-1) and the second scan line SL1-2 (as the second scan signal S1-2) for the pixel P11 and the pixel P21 to emit light. To this end, the demux DM_S in FIG. 6 may output the scan signal 51 to both the first scan line SL1-1 and the second scan line SL1-2. For example, the scan selection signal SEL_S may include two or more bits in some embodiments.

FIG. 8 shows a waveform diagram in which the display mode is the first mode and thus, an identical data signal may be transmitted to the pixels P11 and P21 included in the pixel group. For example, the first data signal D1-1 transmitted to the first data line DL1-1 may be transmitted to both the pixel P11 and the pixel P21, and the second data signal D1-2 transmitted to the second data line DL1-2 may be at the OFF level. When the scan signal 51 is concurrently transmitted to the first scan line SL1-1 and the second scan line SL1-2, an identical data signal may be transmitted to both the pixel P11 and the pixel P21.

However, the embodiments are not limited thereto. In some embodiments, the first data signal D1-1 may be applied only to the first data line DL1-1; data signal may not be directly applied to the second data line DL1-2 (that is, the second data signal D1-2 may not be applied thereto); and the first data signal D1-1 applied to the first data line DL1-1 may be transmitted to the second data line DL1-2 through a device such as a demux. Thus, an identical data signal may be applied to the pixel P11 and the pixel P22.

FIG. 9 is a waveform diagram in which the display apparatus 100 is driven in the second mode, a scan signal and a data signal are independently transmitted to each pixel in the pixel group G illustrated in FIG. 6, and all pixels are used for the display panel 110 to be driven at the maximum resolution.

Referring to FIG. 9, the scan selection signal SEL_S is used to divide the scan signal 51 in half and then the scan signal is sequentially provided to the first scan line SL1-1 (as the first scan signal S1-1) and the second scan line SL1-2 (as the second scan signal S1-2). Accordingly, the scan signal is sequentially transmitted along the pixel rows. The first data signal D1-1 includes a data signal to be transmitted to the pixels in the first column, and the second data signal D1-2 includes a data signal to be applied to the pixels in the second column. In FIG. 9, the display mode is the second mode and thus, each of the pixels may emit light by receiving an individual data signal.

In FIGS. 7 to 9, the scan signal S1 and the scan selection signal SEL_S are illustrated, but the scan signal S1 and the scan selection signal SEL_S may be omitted in some embodiments. If the scan signal S1 and the scan selection signal SEL_S are omitted, the scan driver 120 may directly generate the first scan signal S1-1 and the second scan signal S1-2 to transmit.

FIG. 9 shows the waveforms of signals transmitted to the display panel in the second mode, which is different from FIGS. 7 and 8 in which the display mode is the first mode. FIGS. 7 to 9 illustrate signals transmitted to a pixel group G in FIG. 6, and as shown in FIG. 6, the pixel group G includes two pixel columns and two pixel rows.

When the pixel group G is classified as shown in FIG. 6, resolutions of the x-axis and y-axis directions are reduced by half. When a display apparatus is driven at a constant frequency regardless of the display mode, a horizontal period 1H for which a data signal is transmitted in the first mode is doubled in the second mode.

The foregoing may be observed in FIGS. 7 to 9. Horizontal period 71 in FIG. 7 denotes the horizontal period 1H in the first mode and is illustrated as being twice as long as a horizontal period 1H in FIG. 9 that is horizontal period 91 in the second mode. However, the present invention is not limited thereto. In some embodiments, the horizontal periods 1H in the first and second modes may be identical and be set to be driven in different frequencies. In other embodiments, the horizontal periods 1H and the frequencies in the first and second modes may be identical, and duty cycles of the scan signal and/or the data signal within each horizontal period 1H in the first and second modes may be set to be different.

FIGS. 10A to 13B are views showing examples of grouping the pixels in a stretchable display apparatus 100 according to an embodiment of the present invention.

Referring to FIGS. 10A and 10B, the display apparatus 100 is contracted in FIG. 10A and is expanded in FIG. 10B. In comparison to FIGS. 4A and 4B, the display apparatus 100 in FIGS. 10A and 10B is expanded only in the x-axis direction. In FIG. 10A, the length of the display apparatus 100 in the x-axis direction is less than the first criterion, and in FIG. 10B, the length of the display apparatus 100 in the x-axis direction is more than the second criterion.

FIGS. 11A and 11B are schematic views showing an area 101 of the display apparatus 100 in FIGS. 10A and 10B, respectively. In further detail, FIG. 11A corresponds to the area 101 of the display apparatus 100 in FIG. 10A, and FIG. 11B corresponds to the area 101 of the display apparatus 100 in FIG. 10B. The areas 101 represent identical areas on the display panel 110 having different degrees of expansion.

Referring to FIGS. 11A and 11B, the display apparatus 100 is driven in the first mode in FIG. 11A, and the display apparatus 100 is driven in the second mode in FIG. 11B. Here, when setting the pixel group G in the first mode, the pixels (for example, two pixels) continuously arranged in a direction along which the length of the display apparatus 100 shortens to less than the first criterion may be set as a group G. For example, when a length in the first direction of the display apparatus 100 is less than the first criterion, the pixels continuously arranged in the first direction may be set as a group G. Since the length in the x-axis direction of the display apparatus 100 in FIG. 10A is less than the first criterion, two adjacent pixels arranged in the x-axis direction in FIG. 11A may be set as a group G.

A data signal is transmitted to each of the pixel groups G. Depending on the embodiment, all the pixels in the pixel group G may emit light according to an identical data value, or some of the pixels in the pixel group G may emit light. Referring to FIGS. 11A and 11B, pixels emitting light are illustrated in dark color. Although only one pixel in the pixel group G in FIG. 11A emits light, the present invention is not limited thereto. When a plurality of pixels included in the pixel group G emit light, the scan driver 120 and the data driver 130 may concurrently apply a scan signal and a data signal to each of the pixels included in the pixel group G.

The lengths in the x-axis and y-axis directions of the display apparatus 100 in FIG. 10B are greater than the second criterion and thus, the display mode is set to the second mode and, referring to FIG. 11B, signals are transmitted to all pixels to independently emit light.

Referring to FIGS. 11A and 11B, a resolution in the x-axis direction in FIG. 11A is reduced in half compared to that of FIG. 11B, but the length in the x-axis direction of the display apparatus 100 in FIG. 11A is also shorter than that in FIG. 11B. As such, substantially the same number of image pixels in a unit length (e.g., inch) emit light and thus, the resolutions of FIGS. 11A and 11B appear to be similar to a user.

Figure 12A:
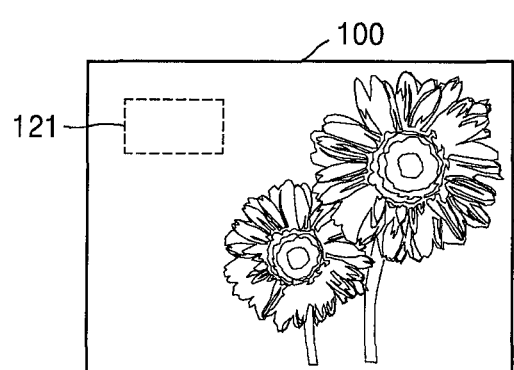
Figure 12B:
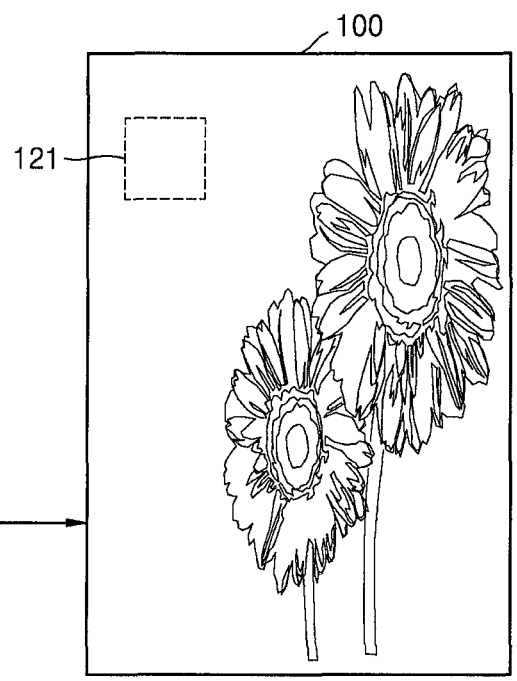

The display apparatus 100 is contracted in FIG. 10A and expanded in FIG. 10B. In comparison to FIGS. 10A and 10B, the display apparatus 100 in FIGS. 12A and 12B is expanded only in the y-axis direction. The length in the y-axis direction is less than the first criterion in FIG. 12A, and the length in the y-axis direction is greater than the second criterion in FIG. 12B.

FIGS. 13A and 13B are schematic views of areas 121 of the display apparatus 100 in FIGS. 12A and 12B, respectively. In further detail, FIG. 13A corresponds to the area 121 of the display apparatus 100 in FIG. 12A, and FIG. 13B corresponds to the area 121 of the display apparatus 100 in FIG. 12B. The areas 121 in FIGS. 12A and 12B represent identical areas on the display panel 110 having different degrees of expansion.

Referring to FIGS. 13A and 13B, the display apparatus 100 is driven in the first mode (e.g., low resolution) in FIG. 13A, and the display apparatus 100 is driven in the second mode, such as the maximum resolution, in FIG. 13B. Here, when setting pixel groups G in the first mode, pixels continuously arranged in a direction along which the display apparatus 100 contracts to be less than the first criterion may be set as a group G. In FIG. 12A, the length in the y-axis direction of the display apparatus 100 is less than the first criterion and thus, in FIG. 13A, two adjacent pixels continuously arranged in the y-axis direction are set as the group G.

A data signal is transmitted to each of pixel groups G. Accordingly to the embodiment, all the pixels in the pixel group G may emit light according to an identical data value or only some of the pixels in the pixel group G may emit light. Referring to FIGS. 13A and 13B, the pixels emitting light are illustrated in dark color. Although only one pixel in each of the pixel groups G is illustrated to emit light in FIG. 13A, the present invention is not limited thereto. When a plurality of pixels included in a pixel group G emit light, the scan driver 120 and the data driver 130 may concurrently transmit a scan signal and a data signal to each of the pixels included in the pixel group G.

The lengths in the x-axis and y-axis directions of the display apparatus 100 illustrated in FIG. 12B are greater than the second criterion and thus, the display mode is set to the second mode and signals are transmitted, referring to FIG. 13B, to all pixels to emit light.

Referring FIGS. 13A and 13B, the resolution for the y-axis direction in FIG. 13A is reduced in half in comparison to FIG. 13B. However, the length in the y-axis direction of the display apparatus 100 in FIG. 13A is shorter than that in FIG. 13B and thus, substantially the same number of image pixels in a unit length (e.g., an inch) in the y-axis direction are driven. Therefore, FIGS. 13A and 13B seem to have similar resolutions to a user.

As described above, according to one or more embodiments of the present invention, a proper resolution of an image may be provided to a user by taking into account a degree of expansion of a display apparatus. Even when the display apparatus stretches, the number of pixels in a unit area (pixels per inch, ppi) does not change significantly and thus, image quality is substantially maintained.

It should be understood that the example embodiments described herein should be considered in a descriptive sense only and not for purposes of limitation. Descriptions of features or aspects within such embodiments should usually be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims and equivalents thereof.

What is claimed is:

1. A display control method of a stretchable display apparatus, the display control method comprising:
   determining a degree of expansion of the display apparatus; and
   controlling a display mode of the display apparatus to be a first mode or a second mode based on the degree of expansion,
   wherein
   a first resolution is embodied in the first mode by transmitting a data signal to each of pixel groups formed by classifying a plurality of pixels into the pixel groups, wherein each of the pixel groups correspond to an image pixel in an image, the data signal is assigned to each of the pixel groups, and each of the pixel groups includes at least two adjacent pixels, and
   a second resolution is embodied in the second mode by transmitting a data signal to each of the plurality of pixels.

2. The display control method of claim 1, wherein
   the determining of the degree of expansion comprises determining the degree of expansion in a first direction and in a second direction perpendicular to the first direction, and
   the controlling of the display mode comprises classifying the plurality of pixels into the pixel groups based on the degree of expansion in each direction.

3. The display control method of claim 2, wherein
   the plurality of pixels are arranged in row and column directions, and
   the first direction is the row direction, and the second direction is the column direction.

4. The display control method of claim 1, wherein in the first mode, only some of the pixels included in each of the pixel groups emit light.

5. The display control method of claim 1, wherein in the controlling of the display mode to be the first mode,
   the display mode is set to the first mode when a length in a first direction of the display apparatus shortens to less than a first criterion,
   the pixels continuously arranged in the first direction are classified into the pixel groups, and
   a data signal is transmitted to each of the pixel groups.

6. The display control method of claim 5,
   wherein in the controlling of the display mode,
   the second mode is selected when the length in the first direction and a length in a second direction perpendicular to the first direction are more than corresponding second criteria respectively pre-set for the first and second directions, and
   the first mode is selected when the length in the first direction or the length in the second direction is less than corresponding first criteria respectively pre-set for the first and second directions, and wherein when the first mode is selected, the first resolution is a resolution with respect to a corresponding one of the first direction or the second direction along which a corresponding one of the lengths shortens to less than the respective first criterion, and is less than a maximum resolution.

7. The display control method of claim 6, wherein respective ones of the first criteria and the second criteria are substantially the same.

8. The display control method of claim 6, wherein respective ones of the first criteria are less than respective ones of the second criteria.

9. The display control method of claim 1, further comprising outputting image signals according to the display mode.

10. A display control apparatus of a stretchable display apparatus, the display control apparatus comprising:
   an expansion level determiner configured to determine a degree of expansion of the display apparatus; and
   a display mode controller configured to control a display mode of the display apparatus based on the degree of expansion,
   wherein the display mode comprises:
      a first mode in which a first resolution is embodied by transmitting a data signal to each of pixel groups formed by classifying a plurality of pixels into the pixel groups, wherein each of the pixel groups correspond to an image pixel in an image, the data signal is assigned to each of the pixel groups, and each of the pixel groups includes at least two adjacent pixels; and
      a second mode in which a second resolution is embodied by transmitting a data signal to each of the plurality of pixels.

11. The display control apparatus of claim 10, further comprising an image signal output unit configured to output image signals according to the display mode.

12. A stretchable display apparatus comprising:
   a display panel stretchable in at least one direction;
   a sensing unit configured to measure a degree of expansion of the display panel; and
   a controller configured to control a display mode of the display apparatus depending on the degree of expansion,
   wherein the controller comprises:
      an expansion level determiner configured to determine the degree of expansion of the display panel; and
      a display mode controller configured to control a display mode of the display apparatus depending on the degree of expansion, and
   wherein the display mode comprises:
      a first mode in which a first resolution is embodied by transmitting a data signal to each of pixel groups formed by classifying a plurality of pixels into the pixel groups, wherein each of the pixel groups correspond to an image pixel in an image, the data signal is assigned to each of the pixel groups, and each of the pixel groups includes at least two adjacent pixels; and
      a second mode in which a second resolution is embodied by respectively transmitting a data signal to each of the plurality of pixels.

13. The stretchable display apparatus of claim 12, wherein the controller further comprises an image signal output unit configured to output image signals according to the display mode.

* * * * *